(12) United States Patent
Mullins et al.

(10) Patent No.: US 6,585,838 B1
(45) Date of Patent: Jul. 1, 2003

(54) ENHANCED PLEATABILITY OF MELTBLOWN MEDIA BY ULTRASONIC PROCESSING

(75) Inventors: Gene Mullins, Cookeville, TN (US); David Dickerson, Livingston, TN (US); Karen Ramsey-Idem, Monterey, TN (US); Lee Currier, Cookeville, TN (US)

(73) Assignee: Fleetguard, Inc., Nashville, TN (US)

( * ) Notice: Subject to any disclaimer, the term of this patent is extended or adjusted under 35 U.S.C. 154(b) by 136 days.

(21) Appl. No.: 09/716,592

(22) Filed: Nov. 20, 2000

(51) Int. Cl.⁷ .............................................. B32B 31/16
(52) U.S. Cl. ................... 156/73.1; 156/308.2
(58) Field of Search ............................... 156/73.1, 308.2, 156/308.4, 554, 555, 580.1, 580.2, 582

(56) References Cited

U.S. PATENT DOCUMENTS

| | | | |
|---|---|---|---|
| 4,093,483 A | | 6/1978 | Jacobs .......................... 156/227 |
| 4,534,819 A | * | 8/1985 | Payet et al. .................... 156/515 |
| 4,605,454 A | * | 8/1986 | Sayovitz et al. ............... 156/73.1 |
| 4,713,132 A | * | 12/1987 | Abel et al. .................... 156/73.1 |
| 5,151,092 A | | 9/1992 | Buell et al. ................. 604/385.2 |
| 5,286,319 A | | 2/1994 | Gawne et al. ................ 156/73.1 |
| 5,389,188 A | | 2/1995 | Hicks ........................... 156/473 |
| 5,427,597 A | | 6/1995 | Osendorf ....................... 55/487 |
| 5,433,715 A | | 7/1995 | Tanzer et al. ................. 604/368 |
| 5,499,978 A | | 3/1996 | Buell et al. ................. 604/385.2 |
| 5,507,736 A | | 4/1996 | Clear et al. ................. 604/385.2 |
| 5,591,152 A | | 1/1997 | Buell et al. ................. 604/385.2 |
| 5,660,679 A | * | 8/1997 | Rajala et al. ............... 156/580.1 |
| 5,690,627 A | | 11/1997 | Clear et al. ................. 604/385.2 |
| 5,711,847 A | * | 1/1998 | Rajala et al. ............... 156/580.2 |
| 5,814,390 A | | 9/1998 | Stokes et al. .................. 428/181 |
| 5,871,605 A | * | 2/1999 | Bett ............................ 156/73.1 |
| 6,123,792 A | * | 9/2000 | Samida et al. ................ 156/73.1 |

FOREIGN PATENT DOCUMENTS

| | | | |
|---|---|---|---|
| DE | 32 22 017 A1 | 12/1983 | ........... B31B/21/74 |
| EP | 0 995 474 A2 | 4/2000 | ........... B01D/29/01 |

* cited by examiner

*Primary Examiner*—James Sells
(74) *Attorney, Agent, or Firm*—Woodard, Emhardt, Moriarity, McNett & Henry LLP

(57) ABSTRACT

A process for enhancing the pleatability of a meltblown web uses ultrasonic bonding wheels to create bond lines in the machine direction as the web is being produced. In addition to, or in place of, the bond lines, ribbons made of the web material, a thermoplastic polymer, string saturated with a phenolic or ultraviolet curing resin, or beads of an ultraviolet curing resin may be ultrasonically bonded to the web to enhance its stiffness. A heated scoring bar or ultrasonic horn forms pleats in the web by heating the web above its glass transition temperature and deforming the web into the pleated configuration. Cooling of the web locks the pleats into position.

32 Claims, 2 Drawing Sheets

ENHANCED PLEATABILITY OF MELTBLOWN MEDIA BY ULTRASONIC PROCESSING

BACKGROUND OF THE INVENTION

The present invention relates to a process for pleating meltblown media, and more specifically, to the use of ultrasonic bonding to impart additional stiffness to meltblown media, thereby enabling pleating. Although the present invention was developed for use in filter devices, certain applications may lie outside of this field.

Meltblown media lack the necessary physical properties that would allow the successful pleating of the media. To enable pleating, meltblown media are usually bonded to a wire screen or to cellulose media. The use of such wire screen or cellulose backing has several disadvantages such as additional material costs, additional weight, slower production of pleats, and potential problems during pleating. For example, when meltblown media backed with a woven wire screen is put through a pleater, the screen may get caught and torn by the pleater. Various methods, including saturating the media with a resin to provide improved stiffness, have been proposed to render meltblown media pleatable.

Hence, the need exists for a process by which meltblown media is made pleatable at higher production rates and reduced cost over the current use of the wire screen and cellulose backing processes. The present invention satisfies this need in a novel and non-obvious way.

SUMMARY OF THE INVENTION

One aspect of the invention described herein is the use of ultrasonic bonding to create additional stiffness in a meltblown web in the machine direction. A heated score bar or ultrasonic horn can then be used to deform the meltblown web and lock in the pleat structure.

One form of the present invention contemplates the use of ultrasonic bonding wheels to create continuous linear bond lines in the machine direction as the meltblown web is being produced. A heated score bar or ultrasonic horn is used to raise the temperature of the web above its glass transition temperature and to deform the web to form the pleats.

In another form of the present invention, ribbons are laid down in the machine direction on the meltblown web and ultrasonically bonded thereto in order to enhance the stiffness of the web. The ribbons may be used alone or in conjunction with the linear bond lines.

Bond lines, either with or without the added ribbons, can be used in conjunction with resin saturation of the meltblown web to create even greater stiffness.

One object of the present invention is to provide a unique process of rendering meltblown media pleatable using ultrasonic bonding.

Further objects, features, and advantages of the present invention will be apparent from the description and drawings contained herein.

DESCRIPTION OF THE PREFERRED EMBODIMENTS

Figure 1:
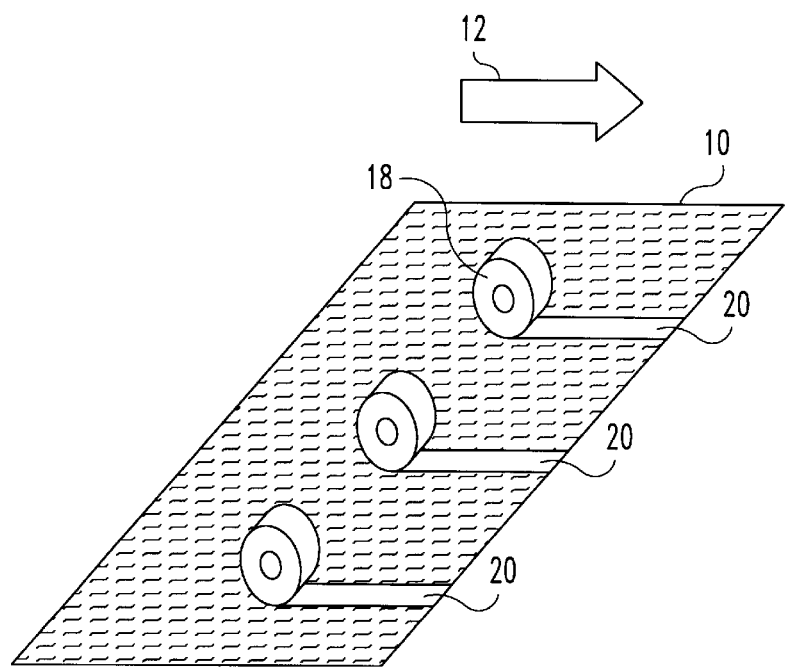
FIG. 1 is a schematic illustration of a process for enhancing the pleatability of meltblown media in accordance with one embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The present invention uses an ultrasonic bonding process to enhance the pleatability of meltblown media. One embodiment of such an ultrasonic bonding process is referred to as ultrasonic point bonding and utilizes ultrasonic energy to excite the meltblown medium and melt the medium at the location of application of the ultrasonic energy. Ultrasonic energy can be supplied by, for example, the provision of an ultrasonic power supply that provides a signal, a converter that converts the signal, and an actuator that causes a device, such as an ultrasonic bonding wheel or horn, to vibrate. Branson Ultrasonics Corporation is one supplier of ultrasonic power supplies, converters, and actuators that are suited for use in conjunction with the present invention.

With reference now to FIG. 1, an ultrasonic point bonding process according to one embodiment of the present invention is schematically illustrated. Meltblown web 10 is produced from a meltblown machine (not shown). The underneath side of web 10 in FIG. 1 could be supported on a solid, smooth surface, such as a table or roll, or alternatively, on a roll engraved with pins. An ultrasonic bonding device, such as bonding wheels 18, is then applied to web 10 such that the evenness of the smooth surface or the pattern or texture of the engraved roll is transferred to web 10. A person of skill in the art will readily appreciate that the ultrasonic bonding device could be an ultrasonic horn instead of the bonding wheels illustrated in FIG. 1.

Ultrasonic bonding wheels 18 create smooth or patterned parallel-spaced bond lines 20 in machine direction 12 as web 10 is produced. Bond lines 20 impart increased stiffness to meltblown web 10 and thereby enhance pleatability of web 10. In the preferred embodiment illustrated in FIG. 1, bond lines 20 are continuous and linear in machine direction 12; however, discontinuous and nonlinear bond lines are also contemplated by the present invention. Depending upon the spacing of bond lines 20, they could replace the point bonding pattern currently used to laminate meltblown media. The width and number of bond lines 20 are determined by optimization of the increased stiffness balanced against the decreased media capacity. Bond lines 20 resemble corrugation or embossing used in cellulose.

Figure 2:
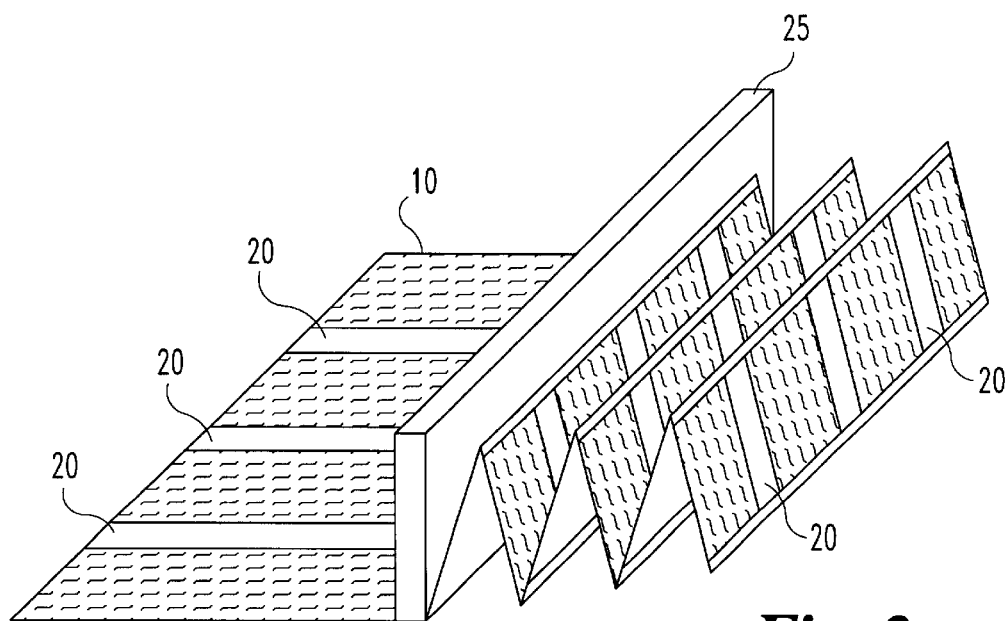
FIG. 2 is a schematic illustration of the step of pleating the meltblown web illustrated in FIG. 1.

FIG. 2 schematically illustrates one embodiment of the process according to the present invention for pleating meltblown web 10. Scoring bar 25 is brought into contact with meltblown web 10 having bond lines 20. If scoring bar 25 is heated sufficiently, the portion of meltblown web 10 in contact with scoring bar 25 is raised above its glass transition temperature. A pleat in web 10 is formed by deforming web 10 with heated scoring bar 25. The pleat is then set or locked into position as meltblown web 10 cools to a temperature below its glass transition temperature. In another embodiment, an ultrasonic horn could be used in place of heated scoring bar 25 to form the pleats in meltblown web 10.

Figure 3:
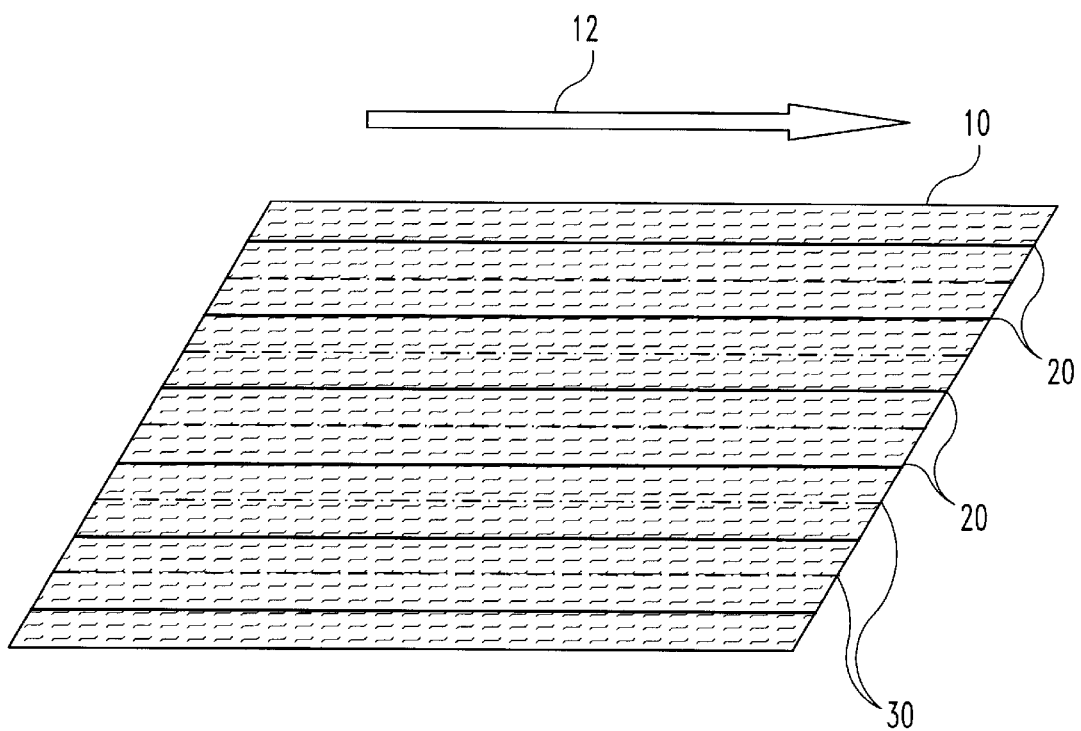
FIG. 3 is a schematic illustration of a process for enhancing the pleatability of meltblown media in accordance with another embodiment of the present invention.

In the alternative embodiment of the present invention depicted in FIG. 3, ribbons 30 are laid down in machine direction 12 on meltblown web 10. Ribbons 30 are not limited to any particular shape and can include strings, strands, or beads of material having various cross-sections including but not necessarily limited to circular, square, and thin rectangular cross-sections. Also, ribbons 30 can be made from various materials. They could, for example, be the same material as web 10. Alternatively, ribbons 30 can be strands of thermoplastic polymer or thermoset strings or cords saturated with a phenolic resin that is then passed through a heater. An alternative type of resin with which ribbons 30 can be saturated is an ultraviolet curing resin. Ribbons 30 can also be beads of an ultraviolet curingresin.

Used alone or in conjunction, as illustrated in FIG. 3, with bond lines 20, ribbons 30 are ultrasonically bonded to meltblown web 10 to enhance the stiffness of web 10. When provided in addition to bond lines 20, ribbons 30 can be arranged in any sequence and spacing with respect to bond lines 20 but are preferably positioned, as depicted in FIG. 3, in an alternating series with bond lines 20. The use of ribbons 30 may replace the use of hot melt beads for pleat spacing.

With or without the additional ribbons 30, bond lines 20 can be employed in conjunction with saturation of meltblown web 10 with a phenolic or ultraviolet curing resin in order to impart even greater stiffness to web 10. Such stiffness enhancement further reduces the risk of pleats blinding off during the use of web 10 in the filtration process.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A process for enhancing the pleatability of a meltblown web, comprising:
   ultrasonically bonding stiffened parallel-spaced bond lines on the meltblown web; and
   saturating the meltblown web with resin.

2. A process for enhancing the pleatability of a meltblown web comprising:
   ultrasonically bonding parallel-spaced bond lines on the meltblown web; and
   ultrasonically bonding ribbons on the meltblown web.

3. The process of claim 2 wherein said ribbons are positioned in an alternating series with said bond lines.

4. A process for enhancing the pleatability of a meltblown web comprising:
   ultrasonically bonding ribbons on the meltblown web, wherein said ribbons are selected from among strands of the meltblown web material, strands of thermoplastic polymer, strings saturated with a phenolic resin or an ultraviolet curing resin, and beads of an ultraviolet curing resin.

5. A process for pleating a meltblown web comprising:
   ultrasonic bonding bond lines to the meltblown web to impart stiffness to the web;
   heating the meltblown web above its glass transition temperature; and
   deforming the web to create a pleat.

6. The process of claim 5 further comprising ultrasonically bonding ribbons to the meltblown web to enhance the stiffness provided by said bond lines.

7. The process of claim 5 further comprising saturating the meltblown web with resin.

8. The process of claim 5 further comprising cooling the meltblown web below its glass transition temperature to retain said pleat in the web.

9. The process of claim 5 wherein deforming the web is accomplished by applying a scoring bar to the web.

10. The process of claim 9 wherein heating the meltblown web is accomplished by heating said scoring bar sufficiently.

11. The process of claim 5 wherein said heating and deforming the web is accomplished by applying an ultrasonic horn.

12. A process for pleating a meltblown web comprising:
    ultrasonic bonding ribbons to the meltblown web to impart stiffness to the web, wherein said ribbons are selected from among strands of the meltblown web material, strands of thermoplastic polymer, strings saturated with a phenolic resin or an ultraviolet curing resin, and beads of an ultraviolet curing resin;
    heating the meltblown web above its glass transition temperature; and
    deforming the web to create a pleat.

13. The process of claim 12 further comprising cooling the meltblown web below its glass transition temperature to retain said pleat in the web.

14. The process of claim 12 wherein deforming the web is accomplished by applying a scoring bar to the web.

15. The process of claim 14 wherein heating the meltblown web is accomplished by heating said scoring bar sufficiently.

16. The process of claim 12 wherein said heating and deforming the web is accomplished by applying an ultrasonic horn.

17. A process for enhancing the pleatability of a meltblown web, comprising:
    ultrasonically bonding stiffened parallel-spaced bond lines on the meltblown web; and
    wherein said ultrasonically bonding includes defining porous filtration areas in the meltblown web between the parallel-spaced bond lines.

18. A process for enhancing the pleatability of a meltblown web, comprising:
    ultrasonically bonding stiffened parallel-spaced bond lines on the meltblown web; and
    pleating the meltblown web.

19. The process of claim 18, wherein said pleating includes:
    heating the meltblown web above its glass transition temperature; and
    deforming the meltblown web to form a pleat.

20. The process of claim 17, wherein said bond lines are patterned.

21. The process of claim 17, wherein said bonding is accomplished by applying ultrasonic bonding wheels to create said bond lines that are continuous and linear in the machine direction.

22. The process of claim 17, wherein said bonding, is accomplished by applying an ultrasonic horn to create said bond lines that are continuous and linear in the machine direction.

23. The process of claim 17 further comprising saturating the meltblown web with resin.

24. The process of claim 18, wherein said bond lines are patterned.

25. The process of claim 18, wherein said bonding is accomplished by applying ultrasonic bonding wheels to create said bond lines that are continuous and linear in the machine direction.

26. The process of claim 18, wherein said bonding is accomplished by applying an ultrasonic horn to create said bond lines that are continuous and linear in the machine direction.

27. The process of claim 18, further comprising saturating the meltblown web with resin.

28. The process of claim 1, wherein said bond lines are patterned.

29. The process of claim 1, wherein said bonding is accomplished by applying ultrasonic bonding wheels to create said bond lines that are continuous and linear in the machine direction.

30. The process of claim 1, wherein said bonding is accomplished by applying an ultrasonic horn to create said bond lines that are continuous and linear in the machine direction.

31. The process of claim 1, further comprising ultrasonically bonding ribbons on the meltblown web.

32. The process of claim 31, wherein said ribbons are positioned in an alternating series with said bond lines.

* * * * *

UNITED STATES PATENT AND TRADEMARK OFFICE
CERTIFICATE OF CORRECTION

PATENT NO. : 6,585,838 B1
DATED : July 1, 2003
INVENTOR(S) : Gene Mullins et al.

It is certified that error appears in the above-identified patent and that said Letters Patent is hereby corrected as shown below:

<u>Column 4,</u>
Line 66, replace "bonding, is" with -- bonding is --.

Signed and Sealed this

Eighth Day of June, 2004

JON W. DUDAS
*Acting Director of the United States Patent and Trademark Office*